US010058036B2

(12) United States Patent
Reinecke et al.

(10) Patent No.: US 10,058,036 B2
(45) Date of Patent: Aug. 28, 2018

(54) STRUCTURAL MEMBERS FOR A SIDE SHAKING SIEVE ARRANGEMENT IN AN AGRICULTURAL HARVESTER

(71) Applicant: CNH Industrial America LLC, New Holland, PA (US)

(72) Inventors: Clay A. Reinecke, Blue Grass, IA (US); Tyler L. Nelson, Rochester, MN (US); Craig E. Murray, Davenport, IA (US); Jishan Jin, Naperville, IL (US); Kai Zhao, Willowbrook, IL (US); Kevin S. Schwinn, Orion, IL (US)

(73) Assignee: CNH Industrial America LLC, New Holland, PA (US)

( * ) Notice: Subject to any disclaimer, the term of this patent is extended or adjusted under 35 U.S.C. 154(b) by 87 days.

(21) Appl. No.: 15/218,678

(22) Filed: Jul. 25, 2016

(65) Prior Publication Data

US 2017/0020075 A1    Jan. 26, 2017

Related U.S. Application Data

(60) Provisional application No. 62/196,175, filed on Jul. 23, 2015.

(51) Int. Cl.
| | | |
|---|---|---|
| *A01F 12/32* | (2006.01) | |
| *B07B 1/00* | (2006.01) | |
| *A01F 12/44* | (2006.01) | |
| *A01D 41/12* | (2006.01) | |
| *A01F 7/06* | (2006.01) | |
| *A01F 12/46* | (2006.01) | |
| *A01F 12/60* | (2006.01) | |

(52) U.S. Cl.
CPC ............ *A01F 12/448* (2013.01); *A01D 41/12* (2013.01); *A01F 7/06* (2013.01); *A01F 12/444* (2013.01); *A01F 12/46* (2013.01); *A01F 12/60* (2013.01)

(58) Field of Classification Search
CPC ...... B01D 29/012; B01D 29/07; B01D 29/72; B01D 29/05; B01D 29/445; B01D 33/0376; B07B 1/46; B07B 1/4645; B07B 1/48; B07B 1/4609; B07B 1/485; A01F 12/446

See application file for complete search history.

(56) References Cited

U.S. PATENT DOCUMENTS

| | | |
|---|---|---|
| D210,243 S | 11/1878 | Dildine |
| 3,100,189 A | 8/1963 | Olender et al. |

(Continued)

FOREIGN PATENT DOCUMENTS

| | | | |
|---|---|---|---|
| DE | 2808716 A1 * | 9/1979 | ............... B07B 1/18 |
| EP | 1609352 A1 | 12/2005 | |

(Continued)

OTHER PUBLICATIONS

European Search Report; 1618107.1-1656; dated Nov. 29, 2016.

*Primary Examiner* — Arpad Fabian-Kovacs
(74) *Attorney, Agent, or Firm* — Patrick M. Sheldrake

(57) ABSTRACT

A sieve arrangement for an agricultural combine harvester includes a sieve frame for carrying a sieve, a side shaker arm, and a plurality of elongate structural members. The sieve frame includes a first side frame member and a second side frame member. The side shaker arm is connected with the first side frame member. Each structural member has a first end connected to the side shaker arm, and a second end connected with the second side frame member.

14 Claims, 7 Drawing Sheets

(56) References Cited

U.S. PATENT DOCUMENTS

| | | | | |
|---|---|---|---|---|
| 3,666,095 | A * | 5/1972 | Krynock | B07B 1/46 209/254 |
| 4,381,235 | A * | 4/1983 | Mallaghan | B07B 1/12 209/400 |
| 5,392,925 | A * | 2/1995 | Seyffert | B07B 1/46 209/403 |
| 5,398,817 | A * | 3/1995 | Connolly | B07B 1/46 209/399 |
| 5,598,930 | A * | 2/1997 | Leone | B01D 29/07 209/403 |
| 5,971,159 | A * | 10/1999 | Leone | B01D 29/012 209/330 |
| 6,325,216 | B1 * | 12/2001 | Seyffert | B01D 29/012 209/399 |
| 6,450,345 | B1 * | 9/2002 | Adams | B01D 29/012 156/210 |
| 6,565,698 | B1 * | 5/2003 | Adams | B01D 29/012 156/290 |
| 6,953,121 | B2 | 10/2005 | Olsen et al. | |
| 7,357,711 | B1 | 4/2008 | Matousek et al. | |
| 2005/0000865 | A1 * | 1/2005 | Schulte, Jr. | B01D 29/012 209/403 |
| 2006/0163121 | A1 * | 7/2006 | Fisher | B01D 33/0376 209/399 |
| 2008/0105598 | A1 * | 5/2008 | Fisher | B07B 1/46 209/402 |

FOREIGN PATENT DOCUMENTS

| | | | |
|---|---|---|---|
| GB | 580251 | A | 9/1946 |
| WO | 200382484 | A1 | 10/2003 |
| WO | 2014093922 | A2 | 6/2014 |

* cited by examiner

STRUCTURAL MEMBERS FOR A SIDE SHAKING SIEVE ARRANGEMENT IN AN AGRICULTURAL HARVESTER

CROSS REFERENCE TO RELATED APPLICATIONS

This is a non-provisional application based upon U.S. provisional patent application Ser. No. 62/196,175, entitled "STRUCTURAL MEMBERS FOR A SIDE SHAKING SIEVE ARRANGEMENT IN AN AGRICULTURAL HARVESTER", filed Jul. 23, 2015, which is incorporated herein by reference.

BACKGROUND OF THE INVENTION

1. Field of the Invention

The present invention relates to agricultural harvesters such as combines, and, more particularly, to cleaning systems used in such combines.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

What is needed in the art is a sieve arrangement for a cleaning system which can better withstand oscillating loads, while still maintaining an efficient cleaning of the grain.

SUMMARY OF THE INVENTION

The present invention provides a sieve arrangement for an agricultural combine, with a shaker arm and structural member attached directly to the shaker arm which transfer oscillating loads directly to the offside structural member of the sieve.

The invention in one form is directed to a sieve arrangement for an agricultural combine harvester. The sieve arrangement includes a sieve frame for carrying a sieve, a side shaker arm, and a plurality of elongate structural members. The sieve frame includes a first side frame member and a second side frame member. The side shaker arm is connected with the first side frame member. Each structural member has a first end connected to the side shaker arm, and a second end connected with the second side frame member.

The invention in another form is directed to an agricultural combine harvester, including a chassis and a sieve arrangement carried by the chassis. The sieve arrangement includes a sieve frame for carrying a sieve, a side shaker arm, and a plurality of elongate structural members. The sieve frame includes a first side frame member and a second side frame member. The side shaker arm is connected with the first side frame member. Each structural member has a first end connected to the side shaker arm, and a second end connected with the second side frame member.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
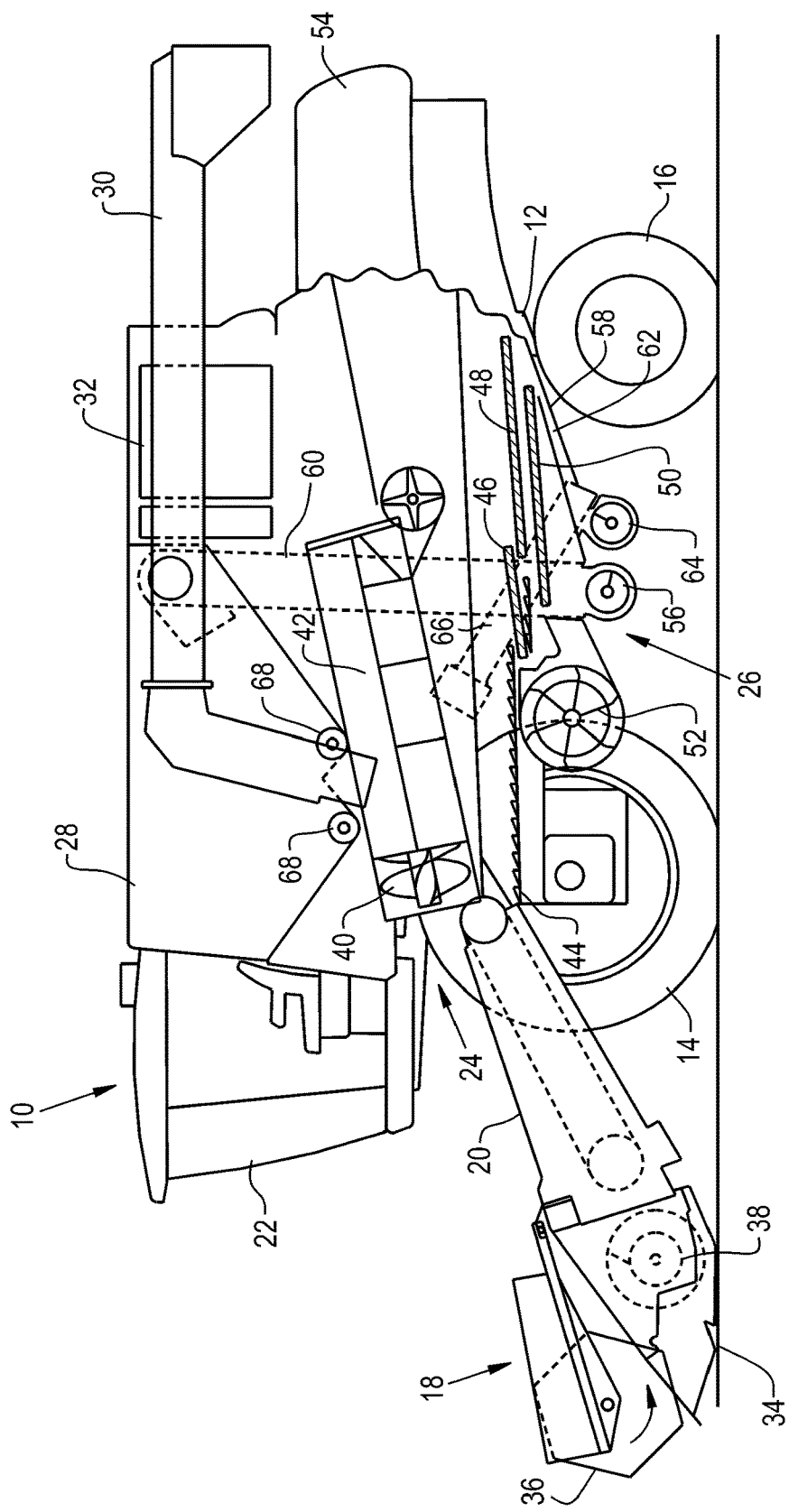
FIG. 1 is a side view of an embodiment of an agricultural harvester in the form of a combine which may include a sieve arrangement of the present invention.
Figure 2:
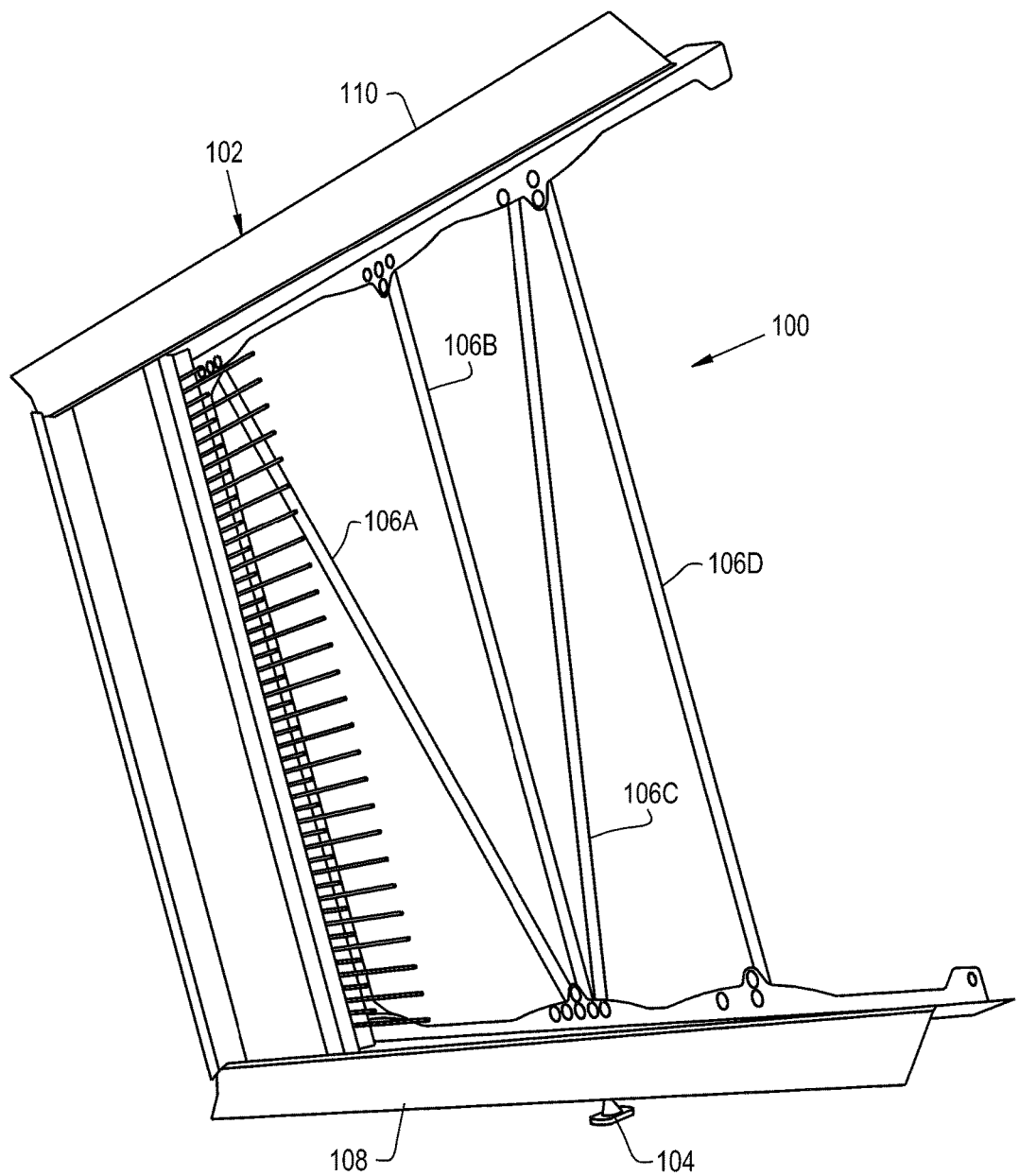
FIG. 2 is a perspective view of an embodiment of a sieve frame of the present invention.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Referring now to FIGS. 2-6, there is shown a sieve arrangement 100 which can be used with the combine harvester 10 shown in FIG. 1. The sieve arrangement 100 is configured as a side shaker sieve and can be used at a suitable sieve location within the cleaning system 26, such as one of the locations designated by sieves 46, 48 and/or 50.

The sieve arrangement 100 generally includes a sieve frame 102 which carries a sieve (not specifically shown in FIGS. 2-6), a side shaker arm 104, and a plurality of elongate structural members 106 (individually referenced as 106A, 106B, 106C and 106D).

The sieve frame 102 includes a first side frame member 108 and a second side frame member 110. In the illustrated embodiment, the first side frame member 108 is configured as a first side rail, and the second side frame member 110 is configured as a second side rail. However, the exact shape and size of the frame members 108 and 110 can vary, depending on the application.

The side shaker arm 104 is connected with the first side frame member 108, but could also be connected with the second side frame member 110, depending on which side of the cleaning system the drive mechanism for the side shaker arm 104 is located. The side shaker arm 104 is also a cast piece in the embodiment shown, but could be a different type of fabricated shaker arm.

Figure 3:
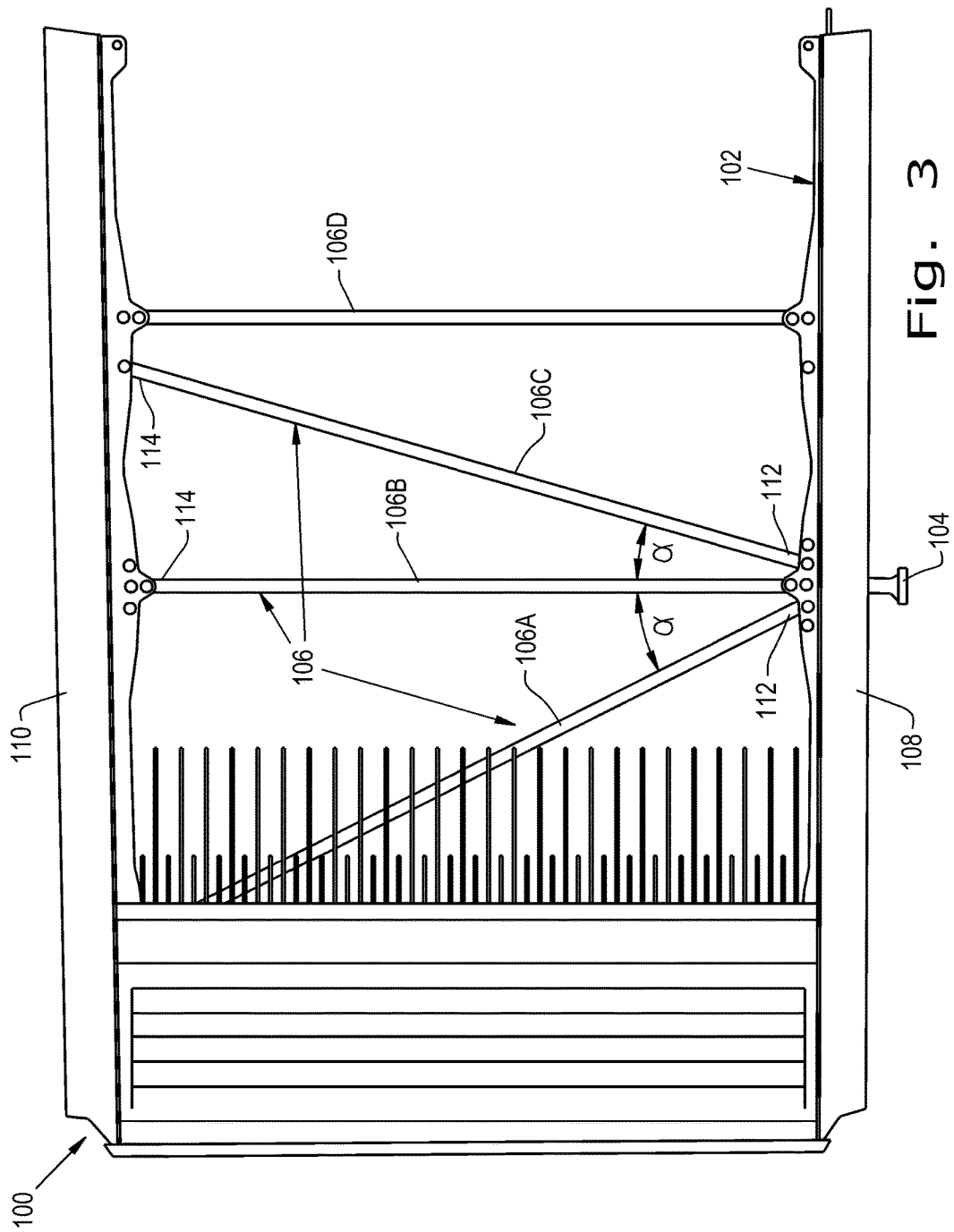
FIG. 3 is a plan view of the sieve frame shown in FIG. 2.
Figure 4:
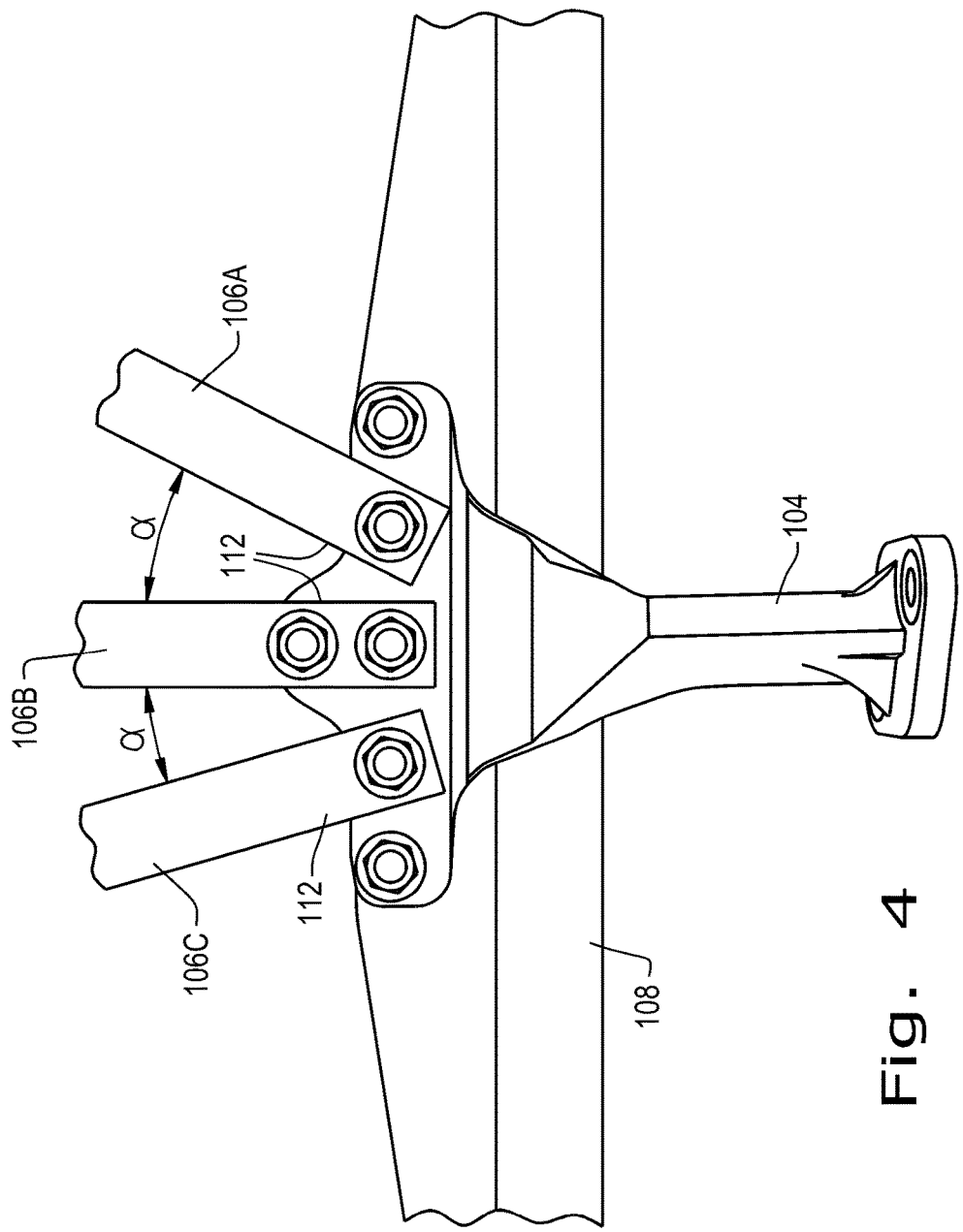
FIG. 4 is a fragmentary, plan view showing the bolted interconnection between the structural members and the side shaker arm.
Figure 5:
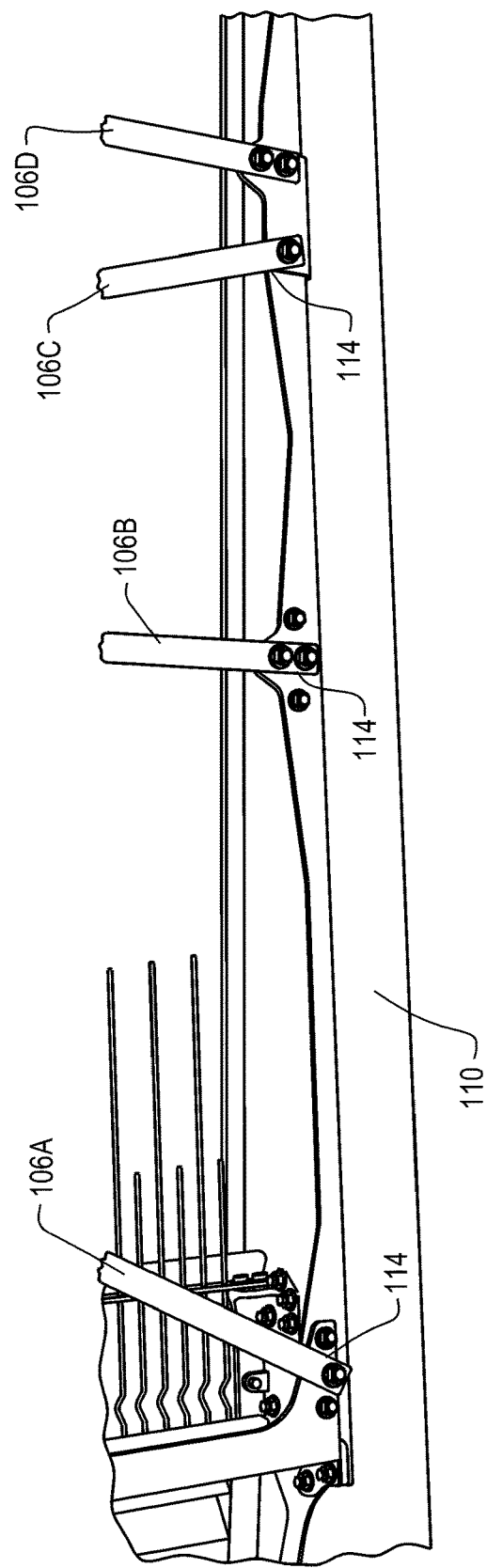
FIG. 5 is a fragmentary, plan view of the sieve frame shown in FIGS. 2-4.
Figure 6:
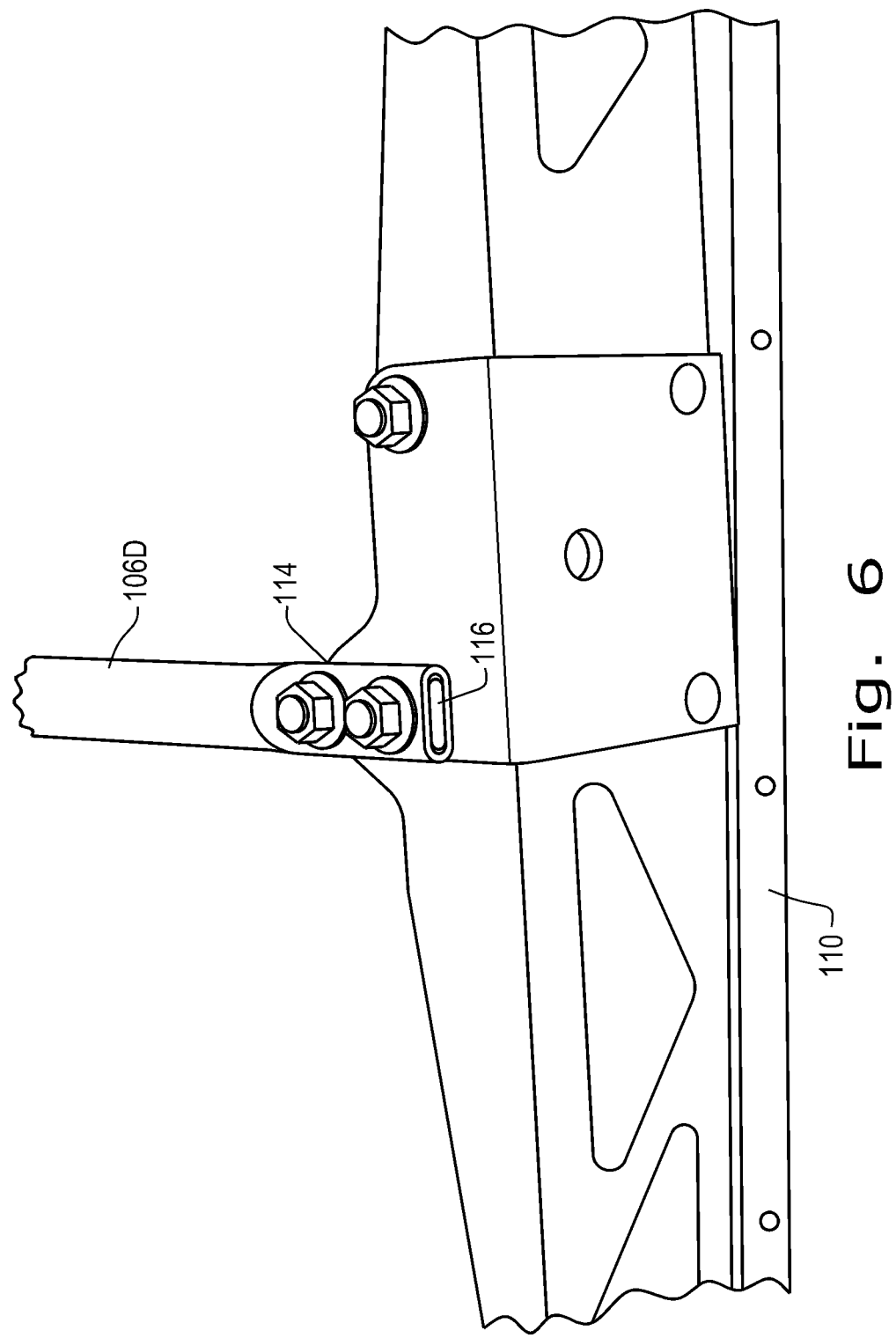
FIG. 6 is a fragmentary, plan view showing the bolted interconnection between one of the structural members and the opposite side frame member.

The plurality of elongate structural members 106 have a first end 112 connected to the side shaker arm 104, and a second end 114 connected with the second side frame member 110 at a respective location along the length of the second side frame member 110. The plurality of structural members 106A, 106B and 106C are arranged in a fanned shaped arrangement, which transfers and distributes loads from the side shaker arm 104 to and along the length of the opposite second side frame member 110. More particularly, referring to FIGS. 2-4, the adjacent structural members 106A, 106B and 106C are arranged with an acute angle α therebetween. The acute angle α can vary between 10° to 45° from one pair of adjacent structural members 106A and 106B, to another pair of adjacent structural members 106B and 106C. Referring to FIG. 3, it can be observed that the acute angle α between structural members 106A and 106B is slightly greater than the acute angle α between structural members 106B and 106C.

Figure 7:
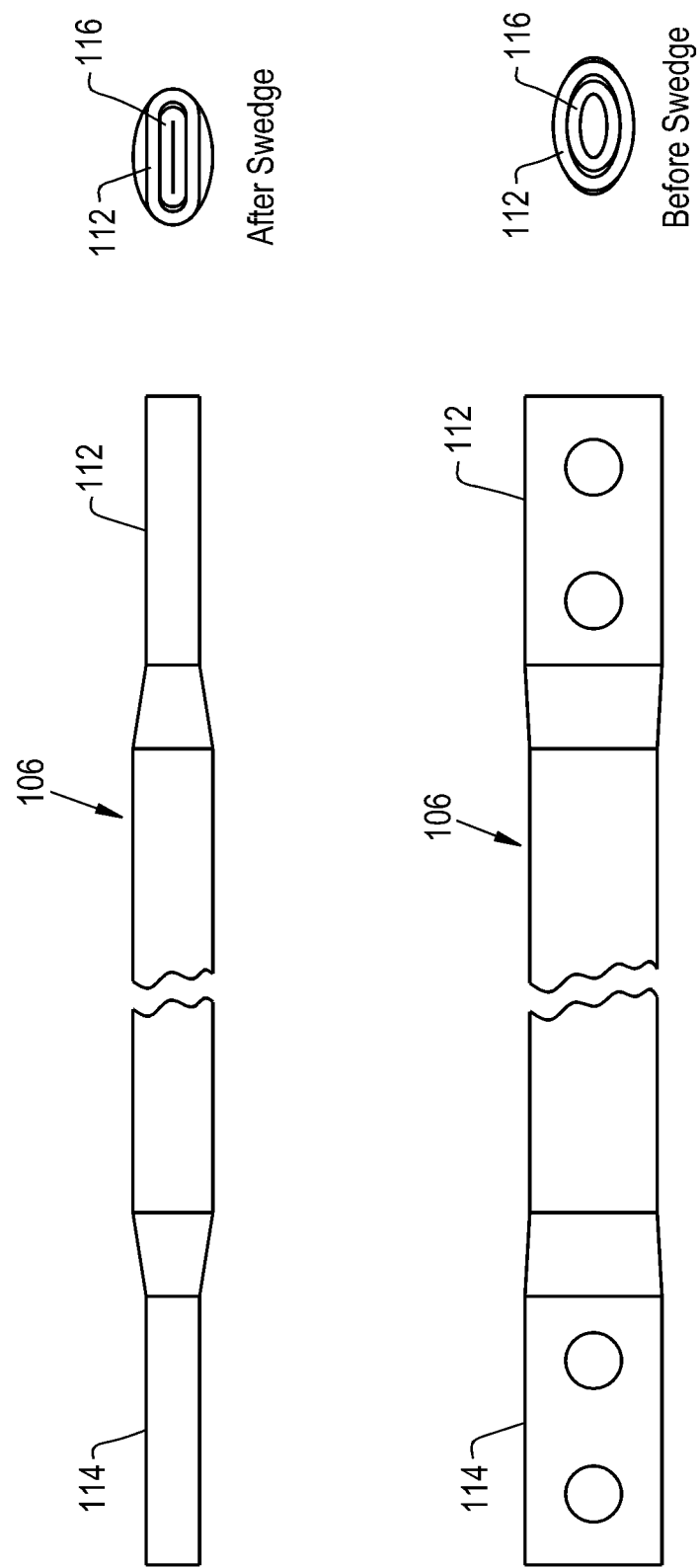
FIG. 7 is a sheet of various engineering drawing views of one of the structural members shown in FIGS. 2-6.

Each of the structural members 106 has a flattened end at each of the first end 112 and the second end 114. Each of the flattened ends 112 and 114 is a hollow end with a flat elongate member 116 positioned therein (see FIGS. 6 and 7). Each of the flattened ends 112 and 114 is bolted to the side shaker arm 104 or the second side frame member 110, respectively.

The present invention strategically uses and positions the stiffening/load transferring structural members 106 in the cleaning system frame to meet the structural requirements of a side shaking cleaning system. The structural members 106 transfer the load from the side shaker arm/mechanism 104 on one side of the cleaning system to the opposing side. The structural members 106 use a bolted design as opposed to a welded frame design.

Current frames are typically welded designs with minimal or no structural supports spanning the frame in the area largely occupied by the sieves. The use of limited or no structural members generally dictate that these frames utilize [large] cross-sectional areas and reinforced joints to handle the forces in the system and control deflection/distortion. The problems with the current designs are numerous: (1) consume valuable space claim limiting the effective cleaning system area; (2) create a very heavy frame which increase the forces/accelerations in the system which must be dealt with; (3) the use of welded designs significantly lower the allowable stress levels to meet high cycle fatigue which in turn drives thicker materials and more structure; (4) additional structure (mass) must be added to limit deflections/distortion which negatively affect system performance (side shaking function) and again reduce the effective envelope available to side shake.

The present invention strategically transfers loads from the side shaking arm 104 located on one side of the cleaning system frame to the opposing side to more evenly distribute stresses throughout the system. The placement of the structural members 106 distributes stresses while controlling and maintaining approximately equivalent deflections in the cleaning system frame comparing side-to-side. The use of bolted joints significantly increases the allowable stress levels which can be absorbed and yet meet high cycle fatigue life goals.

The method of construction of the structural members 106 using hollow pipes is also unique. The structural members 106 use a "tube inside of a tube" design which are subsequently swedged to a flat which creates a solid stack of material so that the subsequent bolted joint can be taken to full torque. This design allows a significantly lighter weight and compact upper sieve frame to be used as opposed to a much heavier [welded/bolted] frame.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sieve arrangement for an agricultural combine harvester, comprising:
    a sieve frame for carrying a sieve, the sieve frame including a first side frame member having a first length and a second side frame member having a second length;
    a side shaker arm connected with the first side frame member; and
    a plurality of elongate structural members, each said structural member having a first end connected to the side shaker arm, and a second end connected with the second side frame member at a respective location along the second length of the second side frame member such that the plurality of elongate structural members are arranged in a fanned shaped arrangement fanning away from the side shaker arm toward each respective location of each second end, and due to the fanned shaped arrangement, the plurality of elongate structural members transfers and distributes a load from the side shaker arm along the second length of the second side frame member.

2. The sieve arrangement of claim 1, wherein adjacent said structural members have an acute angle therebetween.

3. The sieve arrangement of claim 2, wherein the acute angle between each of the adjacent structural members can vary between 10° to 45° from one pair of adjacent structural members to another pair of adjacent structural members.

4. The sieve arrangement of claim 1, wherein each of the structural members has a flattened end at each of the first end and the second end.

5. The sieve arrangement of claim 4, wherein each of the flattened ends is a hollow end with a flat elongate member positioned therein.

6. The sieve arrangement of claim 5, wherein each of the flattened ends is bolted to the side shaker arm or the second side frame member, respectively.

7. The sieve arrangement of claim 1, wherein the first side frame member is a first side rail, and the second side frame member is a second side rail.

8. An agricultural combine harvester, comprising:
    a chassis; and
    a sieve arrangement carried by the chassis, said sieve arrangement including:
        a sieve frame for carrying a sieve, the sieve frame including a first side frame member having a first length and a second side frame member having a second length;
        a side shaker arm connected with the first side frame member; and
        a plurality of elongate structural members, each said structural member having a first end connected to the side shaker arm, and a second end connected with the second side frame member at a respective location along the second length of the second side frame member such that the plurality of elongate structural members are arranged in a fanned shaped arrangement fanning away from the side shaker arm toward each respective location of each second end, and due to the fanned shaped arrangement, the plurality of elongate structural members transfers and distributes a load from the side shaker arm along the second length of the second side frame member.

9. The agricultural combine harvester of claim 8, wherein adjacent structural members have an acute angle therebetween.

10. The agricultural combine harvester of claim 9, wherein the acute angle between each of the adjacent structural members can vary between 10° to 45° from one pair of adjacent structural members to another agricultural combine harvester of adjacent structural members.

11. The agricultural combine harvester of claim 8, wherein each of the structural members has a flattened end at each of the first end and the second end.

12. The agricultural combine harvester of claim 11, wherein each of the flattened ends is a hollow end with a flat elongate member positioned therein.

13. The agricultural combine harvester of claim 12, wherein each of the flattened ends is bolted to the side shaker arm or the second side frame member, respectively.

14. The agricultural combine harvester of claim 8, wherein the first side frame member is a first side rail, and the second side frame member is a second side rail.

\* \* \* \* \*